United States Patent Office 3,024,867
Patented Mar. 13, 1962

3,024,867
DRYING OF NATURAL GAS BY ADSORPTION
Robert M. Milton, Buffalo, N.Y., assignor to Union Carbide Corporation, a corporation of New York
Filed Nov. 30, 1959, Ser. No. 856,257
6 Claims. (Cl. 183—114.2)

This invention relates to the drying of natural gas, and more specifically relates to an improved process for drying a natural gas stream by contact with an adsorbent material.

Drying or dehydrating of natural gas streams is extremely important to industry for several reasons. For example, if the water is not removed, hydrocarbon-water hydrates are formed which deposit as solids. Such hydrates can cause plugging of pipelines, freezing of valves and regulators, and excessive pressure drop in natural gas tranmission conduits. Another reason for drying natural gas is to prevent corrosion of transmission pipe, valves, regulators and the like. Furthermore, dehydration of natural gas eliminates the need for elaborate and costly injections of hydrate-suppressing alcohol or glycerol into transmission conduits. For these reasons, gas transmission companies specify that the gas must be dried to contain less than 7 pounds of water per million standard cubic feet (expressed as 7 lbs. $H_2O$ per MM s.c.f).

Natural gas is also processed at low temperatures in hydrocarbon separation plants. In such systems the gas must be dried to a dew point of $-80°$ F. or below, before passage to the low temperature separation equipment; otherwise the moisture will freeze and deposit in the heat exchange surfaces and will eventually plug the passageways unless removed.

Any natural gas dehydration system should have the following characteristics for high efficiency:

(1) Simplicity of design and equipment with minimal investment and operating cost.

(2) High drying capacity per unit volume of desiccant material used, and coupled with a low ratio of desiccant degraded to volume of gas dried.

(3) Enough flexibility to accommodate changes in gas throughput rate without substantial loss of capacity from reduced contact time.

(4) The ability to remove essentially all the water from the natural gas processed at varying conditions of inlet gas temperature and humidity without otherwise changing the composition of the natural gas.

(5) Safe and effective regeneration of the desiccant after each dehydration cycle.

(6) The system should not contribute corrosive or toxic substances to the natural gas stream which passes through it.

The prior art has employed numerous systems for dehydrating natural gas streams, but none of them has been found entirely satisfactory. That is, none of the prior art systems for the drying of natural gas has all of the aforelisted characteristics.

For example, water has been removed from natural gas by chemical agents, by the use of a liquid desiccant such as diethylene glycol and triethylene glycol, and finally by adsorption on packed beds of solid granular desiccant material which can be regenerated. The chief limitations of chemical drying agents are their poor regeneration characteristics, relatively low drying capacity per unit volume of agent used, and the corrosive and toxic properties of such agents. These factors produce complex operation with frequent desiccant replacement.

Liquid desiccants have significant drawbacks, as for example not being highly selective to water vapor in natural gas; they also adsorb hydrocarbons from the natural gas. Furthermore, liquid desiccants are sensitive to changes in gas temperatures, and are ineffective above about $100°$ F. They cannot dry natural gas below about 5 lbs. $H_2O$ per MM s.c.f., which precludes their use in systems where the natural gas is to be processed in a low temperature hydrocarbon separation system. Liquid desiccants are dangerous to regenerate due to the hydrocarbons they coadsorb, with complicated and expensive equipment and operation being required to prevent ignition. Liquid desiccants present serious corrosion problems in any unit in which they are used, and trace quantities of these liquids may diffuse into the natural gas.

At present, several types of regenerable solid granular desiccant materials are used in packed columns to dehydrate natural gas. They usually consist of the various forms of the substances, $Al_2O_3$ and $SiO_2$, either specially treated or untreated, and are commonly known as the aluminas and silica gels. They have several critical disadvantages as for example low water capacities when contacted with water vapor at low vapor pressures. They are not by themselves, selective adsorbents so constituted that they can adsorb molecules on the basis of size. Alumina and silica gels lose their water capacity at elevated temperatures above about $90°$ F. to such an extent that they are unable to maintain practical uniformity of drying capacity. Also, when alumina type granular desiccants are desorbed, they can become coked or fouled with the hydrocarbons adsorbed from the natural gas. This results in shortened desiccant life, a rapid decline in drying ability, and a high ratio of desiccant degraded per volume of natural gas dehydrated. Finally, some silica gels will fracture when contacted with liquid water or vapor droplets. This causes serious material attrition and powdering.

The principal object of the invention is to provide an improved process for drying natural gas. Further objects are to provide an improved process having high drying capacity per unit volume of desiccant material used coupled with a low ratio of desiccant degraded to volume of gas dried. Another object is to provide a natural gas dehydration system capable of removing essentially all the water from such gas at varying conditions of inlet gas temperature and humidity without otherwise changing the composition of the natural gas. Still another object of the invention is to provide a process for drying a natural gas stream, which process in addition to the previously defined characteristics, permits safe and efficient regeneration of the desiccant after each dehydration cycle, and does not contribute corrosive or toxic substances to the gas stream being processed. Other objects and advantages will be apparent from the subsequent disclosure and appended claims.

Figure 1:
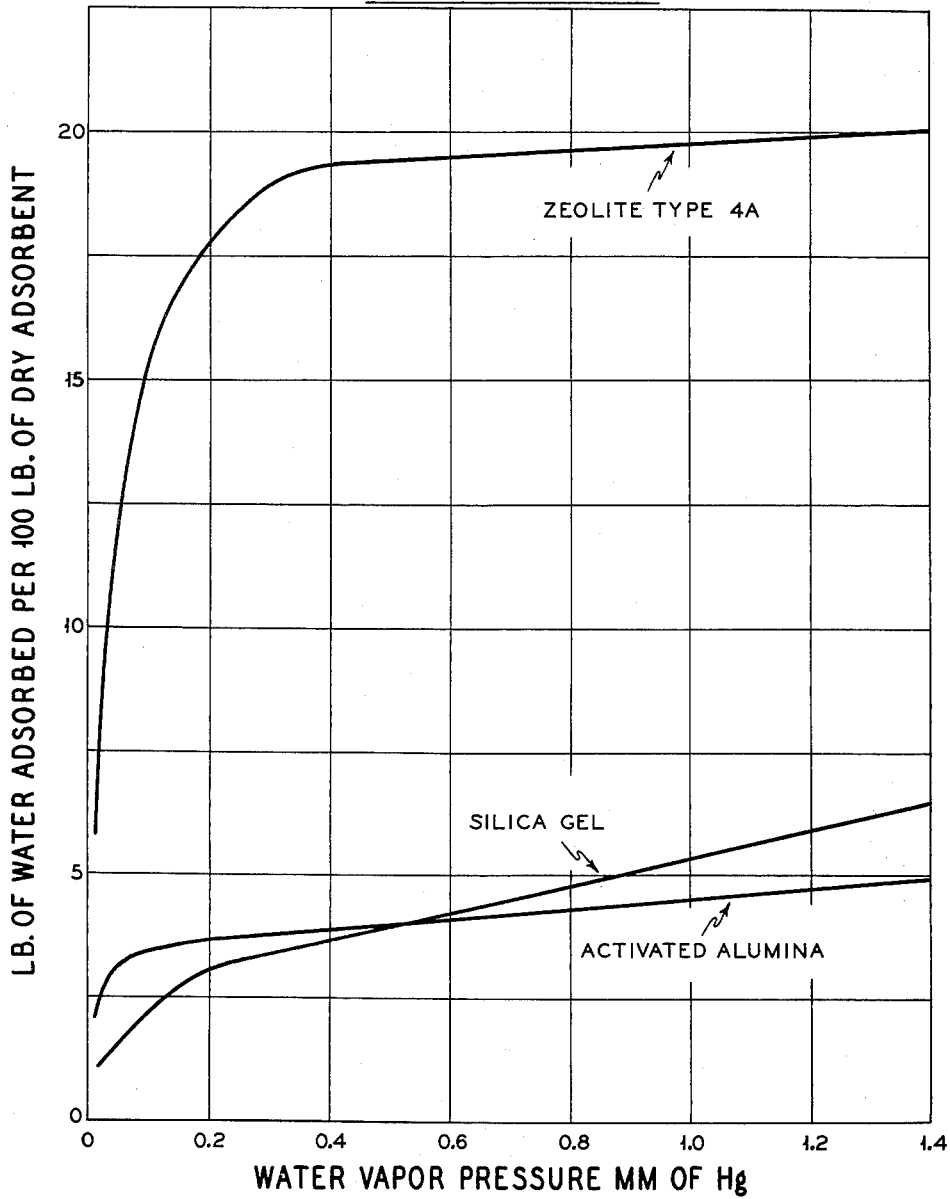
FIG. 1 shows water adsorption isotherms for various materials at relatively low vapor pressures.

It is to be understood that the expression "pore size," as used herein refers to the apparent pore size, as distinguished from the effective pore diameter. The apparent pore size may be defined as the maximum critical dimension of the molecular species which is adsorbed by the zeolitic molecular sieve in question, under normal conditions. Maximum critical dimension may be defined as the diameter of the smallest cylinder which will accommodate a model of the molecule constructed using the best available values of bond distances, bond angles, and Van der Waal radii. Effective pore diameter is defined as the free diameter of the appropriate silicate ring in the zeolitic structure. The apparent pore size for a given zeolitic molecular sieve will always be larger than the effective pore diameter.

It has been unexpectedly found that certain naturally occurring and synthetic crystalline zeolites of suitable pore size have a remarkably high affinity for water. That is, the pores must be sufficiently large to permit entry of the water molecules. Molecular sieves having pores with a minimum dimension of less than about 4.7 angstrom units have been found satisfactory. That is, the pores should be sufficiently small to exclude aliphatic hydrocarbons larger than propane for at least two important reasons. If hydrocarbons such as butane, pentane, hexane and the like are adsorbed by molecular sieves, carbonaceous residues tend to build up in the pores and such residues are not readily desorbed by the advancing water adsorption zone or by the heat and purge conditions employed for desorption. Also, it has been found that when the moisture-depleted natural gas stream is subsequently passed to a hydrocarbon recovery system, the condensation of vapors is improved by the presence of heavier aliphatic hydrocarbons. The latter act as nucleation points for such condensation.

Furthermore, the present molecular sieves are so constituted in their molecular arrangement of atoms that they can effect a separation of natural gas and water on the basis of molecular size and molecular polarity. These particular zeolites not only have a high affinity for water but will preferentially adsorb it rather than another substance of similar molecular dimensions. In addition, these zeolites demonstrate a high water capacity at low vapor pressures and at elevated temperatures, thereby overcoming critical limitations of prior art natural gas dehydrating systems.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolite molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention are chabazite and erionite. The natural materials are adequately described in the chemical art. The preferred synthetic zeolite molecular sieves include zeolite A, D, R, S and T.

The pore size of the zeolitic molecular sieves may be varied by employing different metal cations. For example, sodium zeolite A has a pore size of about 4 angstrom units whereas calcium zeolite A has a pore size of about 5 angstrom units, so that the latter would not be suitable for use in the present invention.

Zeolite A is a crystalline zeolitic molecular sieve which may be represented by the formula:

$$1.0\pm0.2 M_{\frac{2}{n}}O : Al_2O_3 : 1.85\pm0.5 SiO_2 Y H_2O$$

wherein M represents a metal, $n$ is the valence of M, and Y may have any value up to about 6. The as-synthesized zeolite A contains primarily sodium ions and is designated sodium zeolite A. Zeolite A is described in more detail in U.S. Patent No. 2,882,243 issued April 14, 1959.

Zeolite D is a crystalline zeolitic molecular sieve which is synthesized from an aqueous alumionsilicate solution containing a mixture of both sodium and potassium cations. In the as-synthesized state, zeolite D has the chemical formula:

$$0.9\pm0.2\ [xNa_2O:(1-x)K_2O]:Al_2O_3:wSiO_2:yH_2O$$

wherein "$x$" is a value from zero to 1, "$w$" is from about 4.5 to 4.9 and "$y$" in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite T is a synthetic crystalline zeolitic molecular sieve whose composition may be expressed in terms of oxide mole ratios as follows:

$$1.1\pm0.4[xNa_2O:(1-x)K_2O]:Al_2O_3:6.9\pm0.5SiO_2:yH_2O$$

wherein "$x$" is any value from about 0.1 to about 0.8 and "$y$" is any value from about zero to about 8. Further characterization of zeolite T by means of X-ray diffraction techniques is described in copending application Serial No. 733,819, filed May 8, 1958, now Patent No. 2,950,952, issued August 30, 1960.

Zeolite R is described and claimed in U.S. Patent application Serial No. 680,381 filed August 26, 1957.

Zeolite S is described and claimed in U.S. Patent application Serial No. 724,843 filed March 31, 1958.

The present invention also contemplates a method for continuously drying a natural gas stream in which at least two separate zones are provided, each containing a bed of crystalline zeolitic molecular sieve material having pore sizes less than about 4.7 angstrom units. A moisture-containing natural gas feed stream is provided under pressure, and contacted with a first zeolitic molecular sieve bed as an adsorption stroke, thereby adsorbing at least most of the moisture. A moisture-depleted natural gas product stream is discharged from the first bed. A minor portion of the moisture-containing natural gas feed stream is diverted and heated to between 400 and 500° F., and contacted with a second zeolitic molecular sieve bed at the feed gas pressure as the heatup phase of desorption stroke, thereby purging at least most of the moisture having previously been deposited in the second bed during an adsorption stroke. Such contact is continued for sufficient duration so that about 14 pound-moles of heatup gas are employed per 100 pounds of molecular sieve material. A moisture-laden heatup gas stream is discharged from the second bed, and cooled so as to condense at least part of the contained moisture. The condensed moisture is removed from the cooled heatup gas. In a stripping phase of the desorption stroke, the flow of the heated minor portion is continued through the second bed for sufficient duration to reduce the residual water loading of such bed to less than about 8 pounds $H_2O$ per 100 pounds of molecular sieve material. The gas flows are periodically switched between the first and second beds thereby passing the gas inlet stream to the second bed as an adsorption stroke and passing the heated minor portion of the feed stream to the first bed as a desorption stroke.

As used in the specification and ensuing claims, the expression "natural gas stream" refers to a mixture of gases comprising primarily methane with traces of at least the following components as minor constituents: helium, nitrogen, carbon monoxide, carbon dioxide and ethane.

The strong affinity of certain zeolitic molecular sieve materials for water was clearly illustrated in a series of tests in which a representative natural gas stream was dehydrated from approximately 5.0 lbs. $H_2O$ per MM s.c.f. to less than 0.01 lb. $H_2O$ per MM s.c.f.

In another series of tests, four types of synthetic zeolitic molecular sieves were tested in a 1½ inch I.D. by 18-inch long experimental column, through which pipeline natural gas was passed at pressures of approximately 600 p.s.i.g. and inlet water contents of about 5 lb. $H_2O$ per MM s.c.f. The four types of molecular sieves tested were sodium zeolite A with a pore size of about 4 angstroms, calcium zeolite A with a pore size of about 5 angstroms, sodium zeolite Y having a pore size of about 10 angstroms, and sodium zeolite X also having a pore size of about 10 angstroms. When the tests were started, it was impossible to detect water in the effluent gas by conventional means. Natural gas was continually passed to each of the molecular sieve beds, with the exception of the zeolite X bed, until the effluent water content equalled the inlet water content. This assumed that the equilibrium water capacity of the zeolitic molecular sieves had been reached. After the tests were completed, the hydrocarbon and water loadings on the zeolitic molecular sieves were determined. Studies were also performed to determine the distance through the bed that an increment of inlet gas had to travel before it was dried to effluent water content specifications. This transfer zone is a finite length for any given velocity of natural gas through the bed, and it is a necessary value for designing adsorption beds. The data covering these capacity and mass transfer tests is tabulated in Table I.

*Table I*

| Type molecular sieve tested | 4A 1/16 in. pellets | 4A 1/8 in. pellets | 5A 1/16 in. pellets | 13Y 1/16 in. pellets | 13X 1/16 in. pellets |
|---|---|---|---|---|---|
| History of the molecular sieve | (a) | (b) | (a) | (a) | (a) |
| Bed bulk density lb./ft.³ dry adsorbent | 43.7 | 43.6 | 41.7 | 32.2 | 40.8 |
| Bed and inlet gas temperature, °F | 50 | 63.3 | 68.4 | 63.6 | 33 |
| Gas pressure over the bed, p.s.i.g | 544 | 568 | 596 | 560 | 610 |
| Vapor pressure of $H_2O$, mm. Hg | 2.39 | 2.9 | 3.54 | 3.25 | 1.68 |
| Loading of Water on the bed (lb. $H_2O$/lb.) at the end of the test, lb./lb | 0.224 | 0.1775 | 0.1646 | 0.239 | 0.165 |
| Lb. of $H_2O$/ft.³ of bed | 9.78 | 7.75 | 6.85 | 7.70 | 6.73 |
| Superficial linear gas velocity through bed at pressure, ft./sec | 0.42 | 0.425 | 0.405 | 0.423 | 0.954 |
| Length of the $H_2O$ mass transfer zone, inches | 6.96 | 7.28 | 10.2 | c 12.75 | c 15.6 |
| Loading of hydrocarbons on bed at end of test lb./lb.d | 0.006 | 0.004 | 0.0385 | 0.0063 | 0.073 |
| Lb. of hydrocarbons ft.³ of bed | 0.262 | 0.175 | 1.61 | 0.203 | 2.98 | a Production grade, Fresh.
b 6,084 cycles natural gas, dehydrated.
c Estimated.
d The natural gas was estimated to contain 18 lb. of $C_5$+ hydrocarbons/ MM s.c.f. on the basis of an analysis of fractions cold trapped at −130° F A close inspection of the data in Table I will reveal the remarkable superiority of the zeolitic molecular sieves employed in the present invention, as compared to molecular sieves having larger pore sizes. It can for example be seen that sodium zeolite 4A permits higher water loadings in shorter mass transfer zones than the other tested molecular sieves.

As previously discussed and illustrated, certain zeolitic molecular sieves have a high affinity for water and will preferentially adsorb it rather than the natural gas constituents, even though some of the latter have molecular dimensions similar to that of water. In addition, these same zeolitic molecular seives demonstrate a high water capacity at low water vapor pressures and at elevated temperatures. These remarkable and unexpected characteristics are clearly illustrated in FIGS. 1 through 3, which represent tests on sodium zeolite A having a pore size of about 4 angstrom units, and comparisons with the behavior of alumina and silica gel under the same conditions.

FIG. 1 shows water adsorption isotherms for zeolite 4A, silica gel, and activated alumina at a temperature of 25° C., with lbs. of water adsorbed per 100 lbs. of dry adsorbent being plotted against the water vapor pressure in mm. of Hg. An inspection of FIG. 1 will reveal the remarkably high capacity of zeolite 4A for water at low vapor pressures as compared to conventional adsorbents. For example, at a water vapor pressure of 0.2 mm. Hg, the capacity of zeolite 4A is about 17.7 lbs., whereas the capacities of activated alumina and silica gel are about 3.5 lbs. and 3.0 lbs. of water respectively. This means that the water capacity of zeolite 4A is at least 5 times that of commonly employed adsorbents at 0.2 mm. Hg. There are frequent industrial situations where an inlet natural gas has a relatively small moisture content but even such water traces are detrimental in the apparatus in which the gas is to be processed. One situation of this type is a low-temperature natural gas distillation column, where very small quantities of water or gas hydrate could freeze out on the liquid gas contact surfaces and eventually cause shutdown. The present invention obviates this problem by providing an adsorption process which substantially removes water traces to a dew point of −80° F. or lower in a highly efficient manner.

Figure 2:
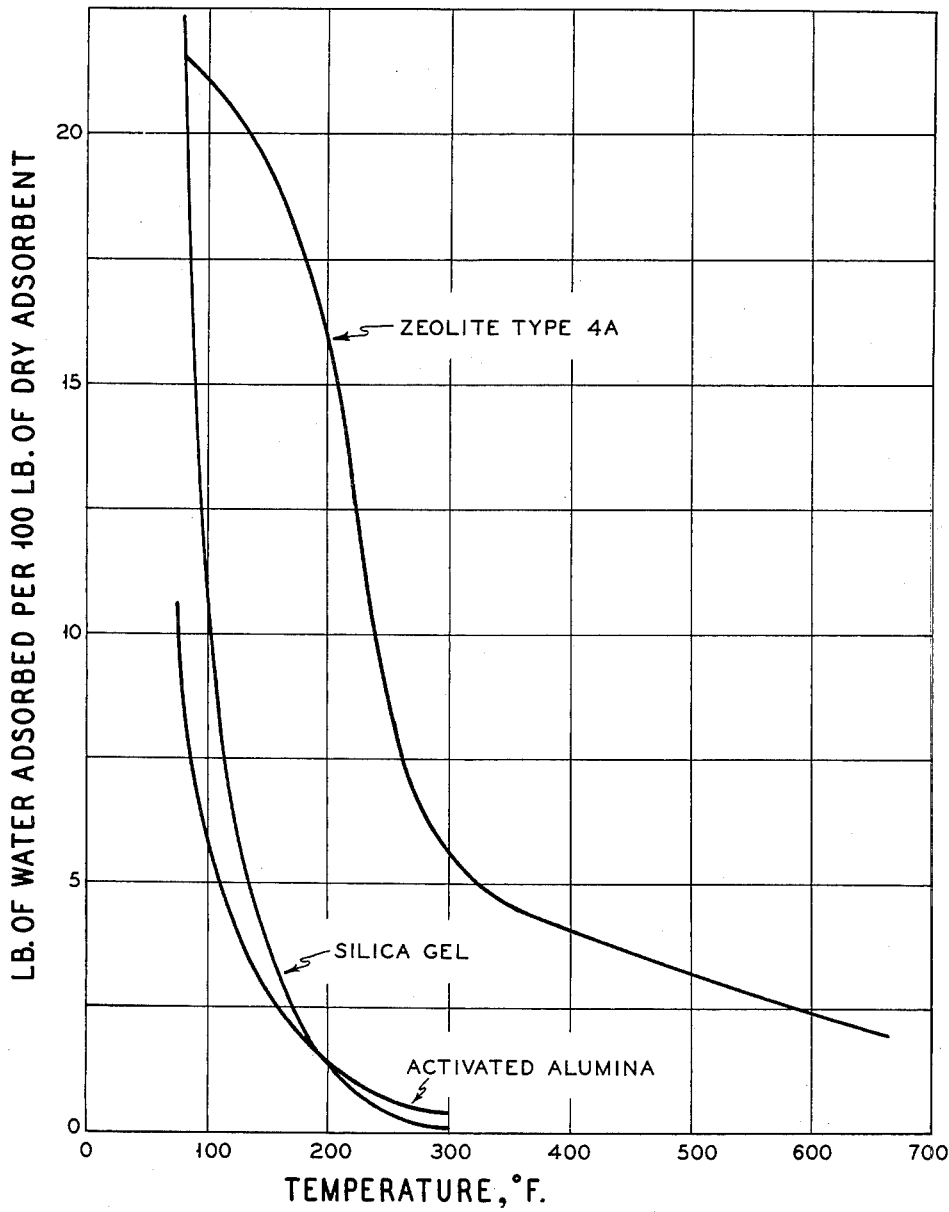
FIG. 2 shows water adsorption isobars for various materials at elevated temperatures.

FIG. 2 shows water adsorption isobars for zeolite 4A, silica gel and activated alumina at a water vapor pressure of 10 mm. Hg. It will be readily apparent that the water capacities of silica gel and activated alumina drop sharply at temperatures approaching 100° F. and at 200° F. such capacities are only about 1.5 lbs. of water. In marked contrast, the water capacity of sodium zeolite type 4A at 200° F. is about 15.8 lbs. Furthermore, zeolite 4A retains a substantial capacity for water at temperatures as high as 600° F., whereas the common adsorbents have essentially no capacity at 300° F. and higher. This characteristic of the present zeolitic molecular sieves is of the utmost importance in water-natural gas adsorption systems operating at above ambient temperatures, as commonly employed adsorbents are completely unusable. For example, if a natural gas stream is to be processed above about 100° F., neither silica gel nor activated alumina can be considered satisfactory as adsorbents. It is necessary to either cool the gas to a temperature level at which such adsorbents have reasonable capacities, or inefficient chemical agents or liquid dessicants must be used at the higher temperature level. The present invention permits the employment of a highly efficient adsorption system at elevated temperatures, thereby eliminating the necessity of using valuable refrigeration to cool the inlet natural gas.

Figure 3:
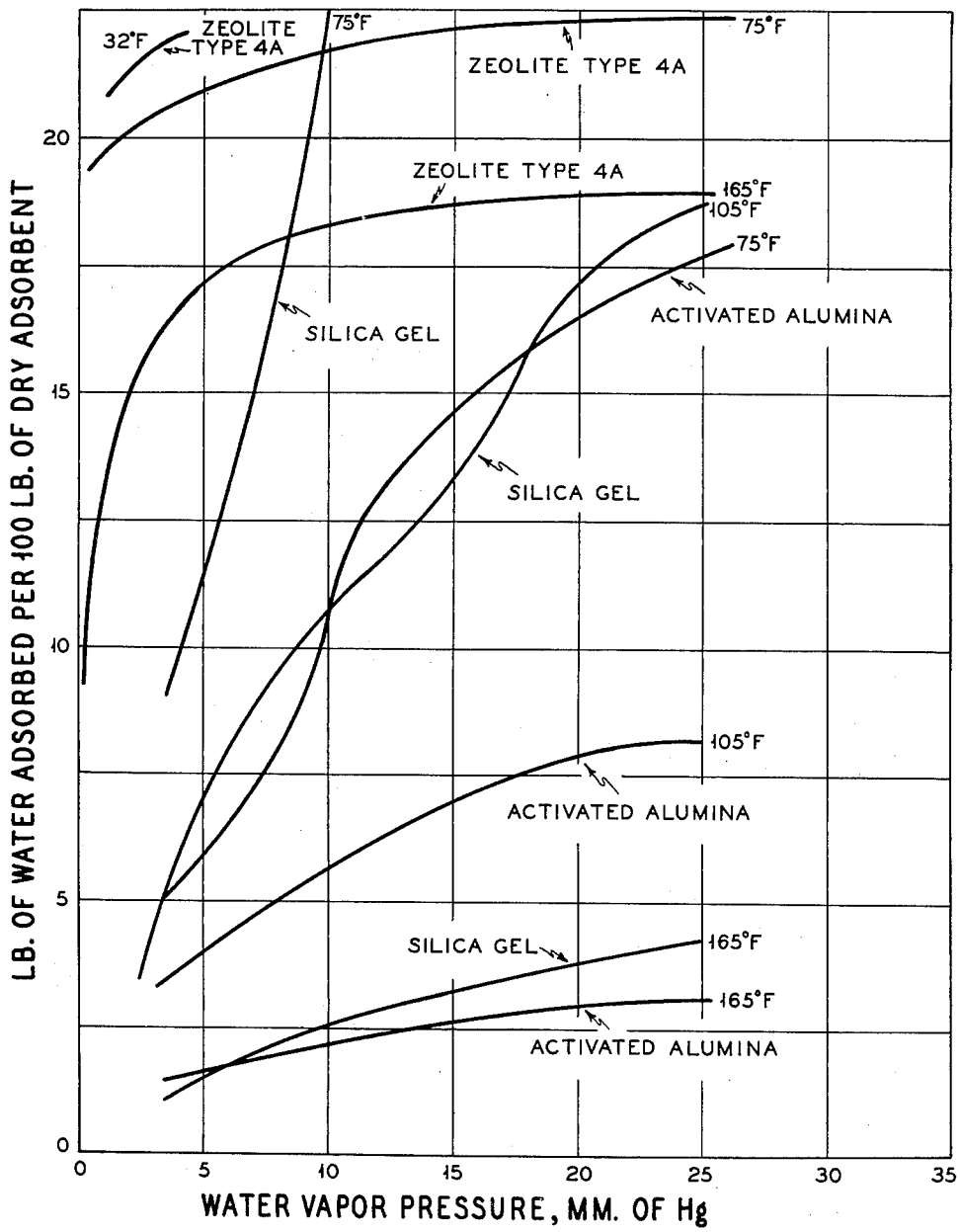
FIG. 3 shows a series of water adsorption isotherms for various materials at certain elevated temperatures.

FIG. 3 is a series of water adsorption isotherms for temperatures of 32° F., 75° F., 105° F. and 165° F. These curves again show that silica gel and activated alumina lose their adsorption capacities rapidly as the adsorption temperature increases, whereas sodium zeolite type 4A only suffers a slight reduction in water capacity when the temperature is increased from 75° F. to 165° F.

As previously discussed, industry has different requirements for the degree of natural gas dehydration, depending on the intended use for such gas. The present invention provides a method which is uniquely suited for dehydrating natural gas to pipeline transmission specifications of less than about 7 pounds $H_2O$ per MM s.c.f.

This invention also affords a modified method which is particularly advantageous for more thoroughly drying natural gas to a dew point at least as low as —80° F. (less than about 0.02 lbs. H₂O per MM s.c.f.) so that the gas may be employed in low-temperature hydrocarbon separation systems.

Figure 4:
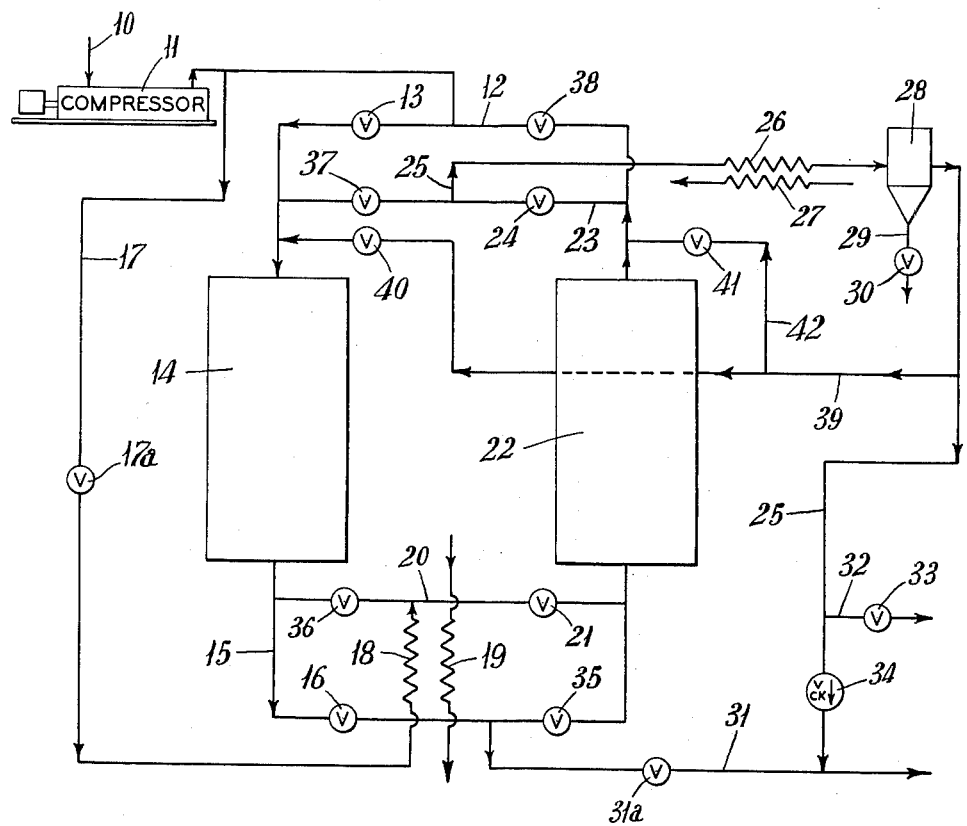
FIG. 4 is a schematic flowsheet of a system for dehydrating natural gas according to the present invention.

Referring now to FIG. 4, a system adaptable for dehydration of natural gas to either of the above-mentioned specifications is illustrated. It will first be described as uniquely suited for dehydration of natural gas to less than about 7 pounds H₂O per MM s.c.f.

The inlet natural gas is introduced through conduit 10 at a temperature usually in the range of 40 to 120° F. although as previously discussed, the present molecular sieves do not lose their adsorptive efficiency at moderately elevated temperatures as do conventional desiccants. The inlet gas is preferably supplied at a pressure between that in the well itself, and the pipeline into which the gas is to be delivered. The maximum pressure available at the site of the natural gas dehydrating system is preferred, and this is generally in the range of 300 to 1500 p.s.i.g. If necessary, the feed gas may be directed through compressor 11 for pressurization to this range. The compressed inlet gas is directed through branch conduit 12 and control valve 13 therein to a first zeolitic molecular sieve bed 14 consisting of material having pores smaller than about 4.7 angstrom units. Moisture is selectively adsorbed by the zeolitic adsorbent material, and the resulting moisture-depleted natural gas product is discharged from the bed through branch conduit 15 and control valve 16, having a dew point of —15° F. or lower.

A minor portion of the moisture-containing natural gas feed stream is diverted from conduit 10 through branch conduit 17 and control valve 17a therein for heating to between 400 and 500° F. in passageway 18, the latter being in heat exchange relation with passageway 19. A suitable heating medium as for example combustion gas is directed through passageway 19, preferably in countercurrent flow relation to the diverted feed gas portion. This temperature range is preferred since the purging rate is prohibitively low at temperatures below 400° F. Also, the zeolitic structure is hydrolytically damaged if steamed at temperatures above 500° F., thereby causing loss of adsorptive capacity.

The diverted and heated feed gas portion is directed through branch conduit 20 and control valve 21 therein at the feed gas pressure to a second zeolitic molecular sieve bed 22 for flow therethrough as the heatup phase of a desorption stroke. That is, the diverted heatup gas warms second bed 22 and thereby purges at least most of the moisture having previously been deposited therein during the preceding adsorption stroke. About 14 pound-moles of the feed gas are required for each 100 pounds of the molecular sieve adsorbent to perform this function. The heatup phase of the desorption stroke is conducted essentially at feed gas pressure for at least two important reasons: to improve heat transfer and to facilitate reblending of the spent heatup gas with the moisture-depleted product gas at the highest possible pressure. The resulting moisture-laden heatup gas is discharged from the second bed 22 into branch conduit 23 and control valve 24 therein, and directed to communicating conduit 25. The moisture-laden gas stream is of course hot, and is cooled to at least as low as 100° F. by flow through passageway 26, the latter being in heat exchange relation with passageway 27 through which a cooling medium such as water flows countercurrently.

The condensed water is removed from the heatup gas stream by entrainment separator 28, the water being periodically drained through conduit 29 having drain valve 30 therein. The resulting cooled heatup gas stream still contains about 35 to 120 lbs. H₂O per MM s.c.f., but is preferably reblended with the moisture-depleted natural gas stream in conduit 31, the latter having been discharged from first molecular sieve adsorbent bed 14 during its adsorption stroke. Conduit 31 contains valve 31a for controlling the gas flow therethrough. Since the heatup gas preferably amounts to only about 3% of the total inlet gas flow, it can be reblended with the main stream of moisture-depleted gas to provide a mixture having less than about 7 lbs. H₂O per MM s.c.f.

After the second bed 22 has reached the desorption temperature, the stripping phase is initiated to further reduce the water loading of the zeolitic molecular sieve to a residual loading of less than about 8 pounds per 100 pounds of adsorbent. Stripping is effected by continuing the consecutive flow of diverted moisture-containing feed gas through conduit 17, heating passageway 18, branch conduit 20, second bed 22, conduit 23 and communicating conduit 25. It has been found that a temperature differential of about 50° F. exists between the gas and the zeolitic molecular sieve during the stripping phase so that the bed temperature is in the range of 350 to 450° F. In order to minimize the partial pressure of the moisture in the stripping gas, the latter is preferably throttled through valve 17a to a pressure in the range of 1 to 5 atmospheres absolute. In view of this pressure reduction, the moisture-containing stripping gas may not be reblended with the moisture-depleted product gas in discharge conduit 31 since the latter is preferably at a substantially higher pressure. Accordingly, the spent stripping gas may be diverted through branch conduit 32 having control valve 33 therein and communicating with conduit 25. Back pressure valve 34 is provided in conduit 25 so as to prevent flow of product gas from conduit 31 therethrough. The spent stripping gas discharged from the system through conduit 32 may be vented to the atmosphere, or preferably burned to recover its heating value after cooling and water separation by means not illustrated.

It has been found that the stripping phase is most effectively performed when the quantity of stripping gas is determined by the following empirical formula:

$$M = 10^{[-3.12 \times 10^{-3}(T+50) + 7.7 \times 10^{-3} P + 3.05]} \quad (1)$$

wherein:

M is the pound-moles of stripping gas employed per 100 pounds of molecular sieve;

P is the pressure in p.s.i.a. at which the stripping phase is conducted; and

T is the temperature in degrees Rankine of the zeolitic molecular sieve bed at the start of the stripping phase.

If appreciably less stripping gas is employed than indicated by Formula 1, the residual water loading on the present zeolitic molecular sieves will be higher than 8 pounds per 100 pounds of adsorbent. This means that the duration of the succeeding adsorption stroke will be markedly reduced; that is, the interval before the dew point of the dehydrated natural gas effluent rises to about —15° F. will be appreciably reduced. Also, insufficient time may be available for most efficient desorption of the off-stream zeolitic molecular sieve bed. In view of the shortened available time, it would be necessary to divert a relatively larger fraction of the natural gas feed stream to effect the heatup and stripping phases. As a consequence, the final moisture content of at least part of such diverted gas after passage through the off-stream zeolitic molecular sieve bed may be sufficiently high so that the gas may not be blended with the smaller quantity of moisture-depleted product stream in conduit 31 without exceeding the maximum allowable concentration of 7 lbs. H₂O per MM s.c.f. in the product gas. On the other hand, if more stripping gas is employed than required by Formula 1, an unnecessarily large quantity of heat must be transferred thereto in passageway 18. Also, the final moisture concentration of the blended product gas is needlessly increased.

The gas flows are periodically switched between the first and second zeolitic molecular sieve beds in a manner well known to those skilled in the art, so that the second bed 22 is placed on adsorption stroke and the first bed 14 is on desorption stroke. That is, valve 13 in branch conduit 12 is closed and valve 34 therein is opened for inlet gas flow to second bed 22. Also, discharge valve 16 in branch conduit 15 is closed, and valve 35 therein is opened. Finally, valve 21 in desorption gas inlet branch conduit 20 is closed and valve 36 is opened; valve 24 in desorption gas outlet conduit 23 is closed and valve 37 therein is opened.

The FIG. 4 system is also adaptable to more thoroughly drying natural gas to a dew point of −80° F. or lower, so that the gas may be employed in low temperature hydrocarbon separation systems. This embodiment of the invention is similar to that previously described for dehydrating natural gas sufficiently to meet the pipeline transmission specification of less than about 7 pounds $H_2O$ per MM s.c.f.

The unique features of the ultra-low dew point embodiment will now be described in detail. The adsorption pressure in first bed 14 is preferably lower than the feed gas pressure in conduit 10, so that the warm-up gas may be blended with such feed gas without repressurization. That is, the spent heatup gas in conduit 25 downstream of water separator 28 is diverted through conduit 39 and control valve 40 therein to conduit 12 for remixing with the feed gas entering first zeolitic molecular sieve bed 14 for adsorption of moisture therein. Similarly, when the second zeolitic molecular sieve bed 22 is on the adsorption stroke, the spent warmup gas is diverted through conduit 39 to communicating branch conduit 40 and through control valve 41 therein. The last-mentioned conduit communicates at its opposite end with conduit 12, so that the spent warmup gas enters second zeolitic molecular sieve bed 22 during its adsorption stroke.

The stripping phase of the desorption stroke is then conducted in the previously described manner, except that the residual water loading of the zeolitic molecular sieve must be reduced to about 3 pounds per 100 pounds of adsorbent. Otherwise the adsorption stroke would be of such short duration that the desorption stroke of the off-stream bed could not be efficiently performed. That is, a prohibitively high quantity of stripping gas would be required and of necessity lost from the moisture-depleted product stream. As in the pipeline natural gas embodiment, it has been found that the stripping phase of the ultra-low dew point embodiment is most efficiently performed, when the quantity of stripping gas is determined by an empirical formula as follows:

$$M = 10^{[-4.35\times10^{-3}T + 4.17\times10^{-3}P + 4.77]} \quad (2)$$

wherein:

M is the pound moles of stripping gas employed per 100 pounds of molecular sieve;

P is the pressure in p.s.i.a. at which the stripping phase is conducted; and

T is the temperature in degrees Rankine of the zeolitic molecular sieve bed at the start of the stripping phase.

The reasons for using the optimum quantity of stripping gas in accordance with Formula 2 are the same as previously discussed in conjunction with Formula 1.

Although preferred embodiments of the invention have been described in detail, it is contemplated that modifications of the method may be made and that some features may be employed without others, all within the spirit and scope of the invention.

This is a continuation-in-part application of my co-pending application Serial No. 400,385 filed December 24, 1953, now abandoned.

What is claimed is:

1. A method for drying a natural gas stream comprising the steps of providing a bed of zeolitic molecular sieve material having pore sizes less than about 4.7 angstrom units in which the zeolite is a member selected from the group consisting of the naturally occurring crystalline moleculer sieves chabazite and erionite and the synthetic crystalline zeolitic molecular sieve types A, D, R, S and T; providing a moisture-containing natural gas feed stream and contacting such stream with the zeolitic molecular sieve bed, thereby adsorbing at least most of said moisture; and discharging a moisture-depleted natural gas stream from such bed.

2. A method according to claim 1 for drying a natural gas stream, in which the zeolite is synthetic crystalline sodium zeolite A.

3. A method for continuously drying a natural gas stream comprising the steps of providing at least two separate zones each containing a bed of crystalline zeolitic molecular sieve material having pore sizes less than about 4.7 angstrom units in which the zeolite is a member selected from the group consisting of the naturally occurring crystalline molecular sieves chabazite and erionite and the synthetic crystalline zeolitic molecular sieve types A, D, R, S and T; providing a moisture-containing natural gas feed stream under pressure, and contacting such stream with a first zeolitic molecular sieve bed as an adsorption stroke, thereby adsorbing at least most of said moisture; discharging a moisture-depleted natural gas product stream from the first bed; diverting a minor portion from said moisture-containing natural gas feed stream and heating such diverted minor portion to between 400 and 500° F.; contacting the heated minor portion with a second zeolitic molecular sieve bed at the feed gas pressure as the heatup phase of a desorption stroke to warm such bed, thereby purging at least most of the moisture having previously been deposited in the second bed during an adsorption stroke, such contact being continued for sufficient duration so that about 14 pounds-moles of heatup gas are employed per 100 pounds of molecular sieve material; discharging a mosture-laden heatup gas from the second bed; cooling such heatup gas so as to condense at least part of the contained moisture; removing the condensed moisture from the cooled heatup gas; as the stripping phase of said desorption stroke, continuing the flow of said heated minor portion through said second zeolitic molecular sieve bed for sufficient duration to reduce the residual water loading of such bed to less than about 8 pounds $H_2O$ per 100 pounds of molecular sieve material; and periodically switching the flows between the first and second beds thereby passing the gas feed stream to said second bed as an adsorption stroke and passing the heated minor feed gas portion to said first bed as a desorption stroke.

4. A method according to claim 3 for drying a natural gas stream, in which the zeolite is synthetic crystalline sodium zeolite A.

5. A method according to claim 3 for drying a natural gas stream, in which said adsorption stroke is continued until the dew point of the moisture-depleted natural gas stream discharged from the first bed rises to −15° F., the cooled heatup gas is mixed with the undiverted moisture-depleted natural gas product stream to provide a composite product gas having a water content of less than about 7 pounds $H_2O$ per MM s.c.f., the heated minor portion is throttled to a pressure of 1 to 5 atmospheres absolute for said stripping phase and contacted with the heated second zeolitic molecular sieve bed in sufficient quantity to satisfy the following formula:

$$M = 10^{[-3.12\times10^{-3}(T+50) + 7.7\times10^{-3}P + 3.05]}$$

wherein:

M is pound-moles of stripping gas employed per 100 pounds of molecular sieve;

P is the pressure in p.s.i.a. at which the stripping phase is conducted;

T is the temperature in degrees Rankine of the zeolitic melocular sieve bed at the start of the stripping phase.

6. A method according to claim 3 for drying a natural gas stream, in which said adsorption stroke is continued until the dew point of the moisture-depleted natural gas stream discharged from the first bed rises to −80° F. the cooled heat up gas is mixed with said moisture-containing gas feed stream for contact with said first zeolitic molecular sieve bed as said adsorption stroke, the heated minor portion is throttled to a pressure of 1 to 5 atmospheres absolute for stripping phase and contacted with the heated second zeolitic molecular sieve bed in sufficient quantity to reduce the residual water loading of each bed to less than about 3 pounds $H_2O$ per 100 pounds of molecular sieve material and to satisfy the following formula:

$$M = 10^{[-4.35 \times 10^{-3}T + 4.17 \times 10^{-3}P + 4.77]}$$

wherein:

M is pound-moles of stripping gas per 100 pounds of molecular sieve;

P is the pressure in p.s.i.a. at which the stripping phase is conducted;

T is the temperature in degrees Rankine of the zeolitic molecular sieve bed at the start of the stripping phase.

References Cited in the file of this patent

UNITED STATES PATENTS

| | | |
|---|---|---|
| 2,638,999 | Berg | May 19, 1953 |
| 2,880,818 | Dow | Apr. 7, 1959 |
| 2,910,139 | Matyear | Oct. 27, 1959 |

FOREIGN PATENTS

| | | |
|---|---|---|
| 555,482 | Canada | Apr. 1, 1958 |

OTHER REFERENCES

"Occulsion of Hydrocarbons by Chabazite and Analcite," Transactions of the Faraday Society (London), vol. 40, (1944), pages 195–216 particularly page 202.

Separation of Mixtures Using Zeolites As Molecular Sieves, Part I. Three Classes of Molecular Sieve Zeolite, J. Soc. Chem. Ind., vol. 64, May 1945, pages 130, 131.